Nov. 30, 1965 H. LOCHER 3,221,171
METHOD AND APPARATUS FOR MEASURING THE DENIER OF YARN
USING PHOTOSENSITIVE OR CAPACITIVE MEANS
Filed July 23, 1962 3 Sheets-Sheet 1

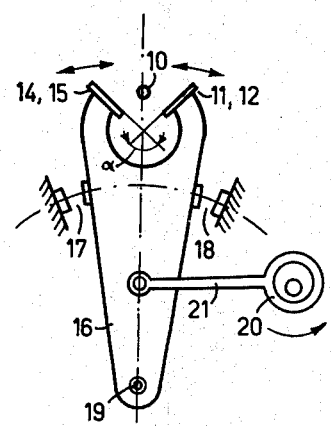
Fig.8
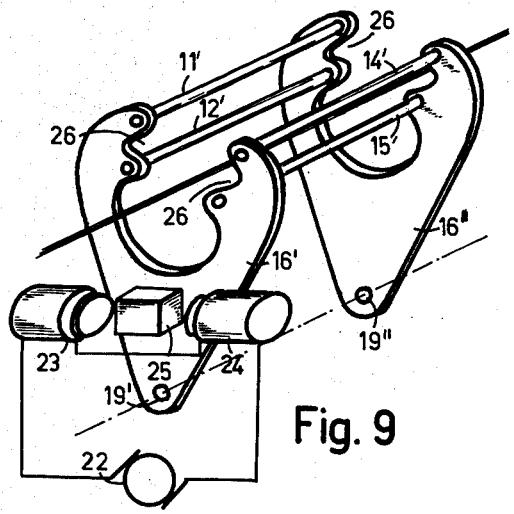
Fig. 9
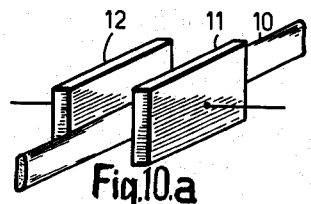
Fig.10.a
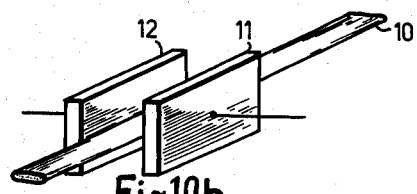
Fig.10.b
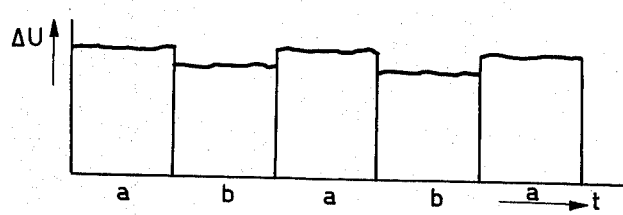
Fig. 11
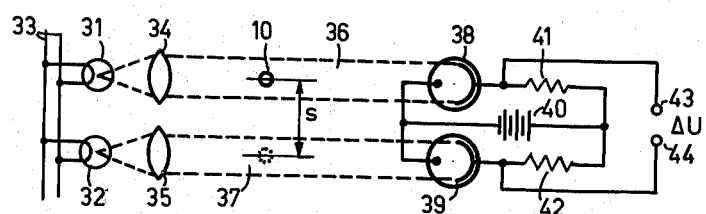
Fig. 12

United States Patent Office 3,221,171
Patented Nov. 30, 1965

3,221,171
METHOD AND APPARATUS FOR MEASURING THE DENIER OF YARN USING PHOTOSENSITIVE OR CAPACITIVE MEANS
Hans Locher, Uster, Switzerland, assignor to Zellweger Ltd., Uster, Switzerland, a corporation of Switzerland
Filed July 23, 1962, Ser. No. 211,732
Claims priority, application Switzerland, July 25, 1961, 8,690/61
18 Claims. (Cl. 250—219)

This invention relates to measuring and supervising the denier of yarns.

Various methods and devices for the measurement and supervision of the denier of yarns are known. These methods are based, for example, on measuring condensers through whose electric field the yarn is moved and forms a part of the dielectric. The weight per unit of length of the material being tested produces a specific change in capacity which is indicated in a desirable manner by suitable means. In this manner, the variations in the weight per unit of length of the yarn are made visible.

So long as the material being tested is always in the same place in the measuring condenser with respect to the electric field, the change in capacity caused by the count of the yarn is superimposed on the normal capacitance of the measuring condenser. In order to measure the count, therefore, it is necessary that the electric circuit which converts the variations in capacitance into corresponding changes in voltage be compensated, before the introduction of the material being tested, in such a manner that the measuring voltage is zero.

However, this method is unreliable because all variations of the normal capacitance which are not attributable to the material being tested (which variations are caused, for example, by fluctuations in temperature, fluctuations in humidity or other influences) are also indicated as fluctuations in count by the measuring apparatus.

It has been proposed in copending patent application Serial No. 827,053, filed July 14, 1959, to periodically laterally reciprocate the material being tested between zones in which the field is differently influenced by the material. In principle it is immaterial whether the measuring field remains fixed in space and the material being tested moves or vice versa.

By this means, any variations in capacitance which are not caused by the tested material and which do not occur at the frequency of the said relative motion can be eliminated.

A further technical difficulty from the measuring point of view in the checking of threads lies in the fact that the cross section of the material being tested is not always round but is often in the form of a ribbon. Experience has shown that such cross-sectional configurations, if twisted relative to the lines of force of the measuring condenser while traveling through a capacitative measuring field, cause variations in capacitance the magnitude of which is comparable to those which are caused by the actual variations of the denier. These changes in capacitance are caused by the fact that the influencing of the field, due to inhomogeneity in the electric field, is dependent on the cross-sectional shape and its orientation in the measuring field, even if the total cross section of the tested material does not change.

It is an object of the present invention to provide a method and an apparatus for measuring and supervising the denier of longitudinally moving threads whereby the shortcomings of conventional methods and apparatus are avoided. In the method according to the invention, the material is moved lengthwise through measuring fields and laterally reciprocated at a given frequency between zones in which the influencing of the field varies in strength so that the thread to be tested alternately influences two measuring fields having lines of force which are orientated with respect to one another at an angle different from zero, the variations produced in the two measuring fields being utilized to produce corresponding voltage fluctuations in a following analysis circuit.

The apparatus according to the invention comprises two measuring fields, the planes of which are disposed with respect to one another at an angle different from zero, and an analysis circuit for producing voltage fluctuations corresponding to the variations in the measuring fields.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 1 shows a simple electric capacitor as a measuring element.

FIG. 2 diagrammatically shows capacitor electrodes placed in a row with the material being tested moving consecutively through the zones of influence of the electrodes.

FIG. 8 is an end view of an arrangement of measuring condensers and of a mechanical drive mechanism for reciprocating the condensers relative to the thread.

FIG. 9 is a diagrammatic perspective illustration of an arrangement of measuring condensers reciprocated laterly of the thread by an electromagnetic device.

FIGS. 10a and 10b each show a measuring condenser with threads of noncircular cross sections passing therethrough at different orientations.

FIG. 11 shows the voltage characteristic of measuring condensers as shown in FIGS. 10a and 10b as a function of time with thread cross sections orientated differently.

FIG. 12 is a diagrammatic illustration of a measuring arrangement having optical measuring fields.

Figure 13:
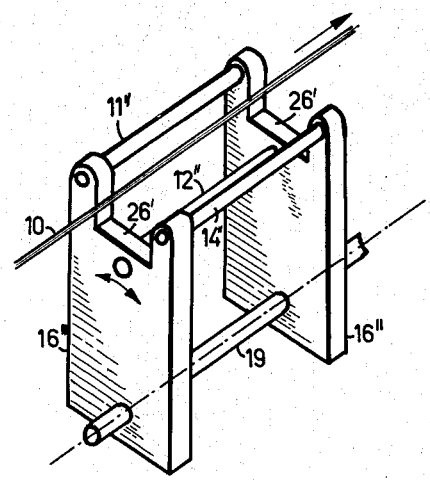

FIG. 13 is a diagrammatic perspective illustration of a further modification of a measuring condenser arrangement.

Figure 14:
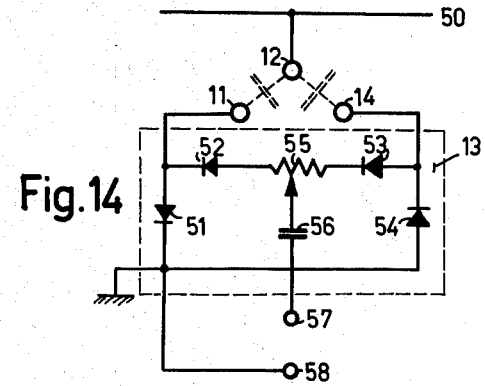

FIG. 14 shows an electric circuit suitable for the analysis of the variations in capacitance occurring in the measuring condensers.

Figure 15:
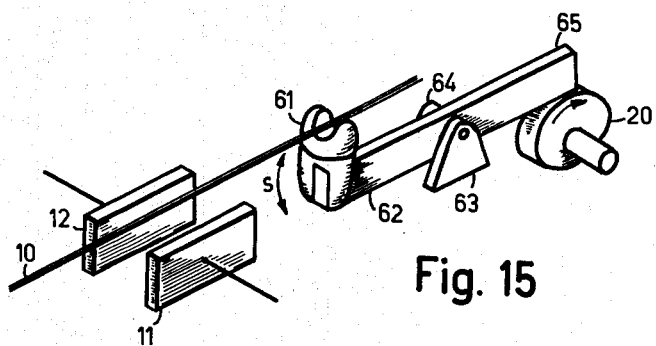

FIG. 15 is a schematic perspective illustration of an apparatus for laterally reciprocating a thread or yarn while longitudinally moving through an electric measuring field.

Figure 1:
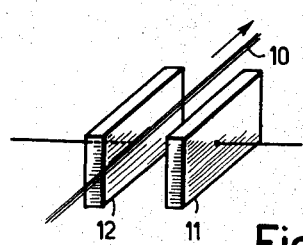

FIG. 1 shows, as an example of a measuring field, a simple measuring condenser with two electrodes 11 and 12 between which the material 10 being tested is conveyed and forms a part of the dielectric. The capacitance produced by this capacitor is therefore influenced by the quantity of the material being tested which is present between the electrodes, that is to say by its weight per unit of length. If the material being tested is moved longitudinally through the capacitor, the capacitance participates in all the fluctuations in the weight per unit of length.

By means of circuits known per se these variations in capacitance can be converted into fluctuations in voltage which in turn may be used for indicating and regulating operations.

Figure 2:
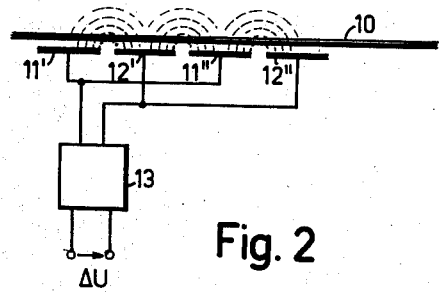

FIG. 2 shows a capacitor arrangement wherein electrodes 11, 12 are arranged in a plurality of component capacitors 11', 11", and 12', 12" which are placed in a row parallel to the direction of travel of the material being tested and which are alternately connected in parallel. The material 10 being tested is opposite one of the electrode surfaces so that the field extending between the electrode parts penetrates into the material being tested and therefore influences the value of the capacitance. The changes in capacitance $\Delta C$ thus produced are transformed into fluctuations in voltage $\Delta U$ in a transformer 13. This arrangement has the advantage over that in FIG. 1 that the material being tested is conveyed above the electrodes and does not have to be introduced between opposite electrodes.

Figure 3:
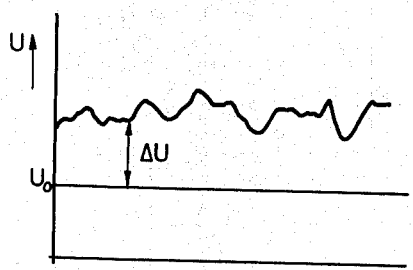
FIG. 3 is a graph of the voltage characteristic of a capacitor according to FIG. 2 as a function of time.

FIG. 3 shows the voltage fluctuations $\Delta U$ as a function of time which are superimposed on the normal voltage $U_0$ of the measuring element when no material is tested. It is assumed that the normal voltage $U_0$ is constant, that is to say that the capacitor itself has a constant normal capacitance. Experience has shown, however, that such capacitors are subject to various influences, such as temperature, humidity, dust and the like, which influence the normal capacitance. Accordingly, if such a capacitor remains in operation without supervision, such disturbances may influence the normal capacitance. These capacitance variations cannot be separated from the variations in capacitance caused by the material being tested, so that false values of the voltage fluctuations $\Delta U$ result. Methods and devices have been proposed in which the material being tested is periodically reciprocated at a specific frequency in the measuring field between regions where the influencing of the field varies in strength, the resulting alternating-current voltage being filtered out and rectified.

Figure 5:
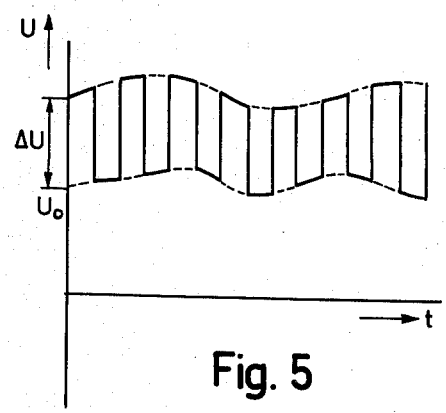
FIG. 5 is a graph of the voltage characteristic of an arrangement as shown in FIG. 4.
Figure 4:
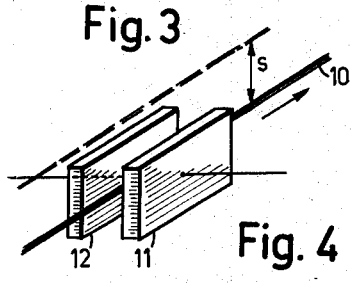
FIG. 4 is a schematic, perspective illustration of an electric capacitor through which passes a thread which is periodically laterally moved.

Such a conventional arrangement is illustrated diagrammatically in FIG. 4. The material 10 being tested is laterally reciprocated through a distance S while the material passes between the electrodes 11, 12 so that during each reciprocating movement it passes at least partially out of the region of greater field strength in the measuring field into a region of lower field strength. The effect is shown in FIG. 5. The intermittent voltage $\Delta U$ is superimposed on the normal value $U_0$ which is assumed to be not constant and therefore may have any characteristic. With this arrangement the quantity $\Delta U$ is obtained which is largely independent of the amount $U_0$.

Figure 6:
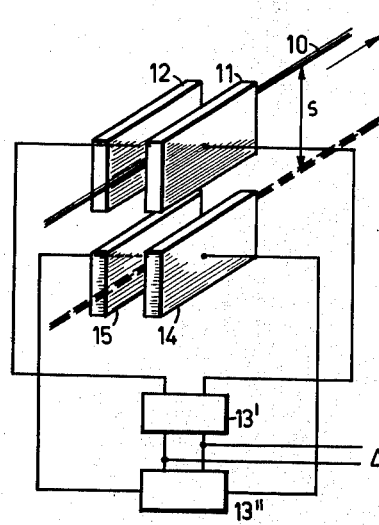
FIG. 6 shows, in principle, two measuring fields lying side by side with a thread reciprocated laterally to be alternately in one and then in the other field while passing through the device.

The conventional measuring method can be considerably improved by the provision of two separate measuring fields, as shown in FIG. 6. In this case the material 10 being measured is laterally reciprocated between the measuring fields and passes out of the measuring field with the electrodes 11, 12 and into the neighboring measuring field with the electrodes 14, 15 and conversely. The variation in capacitance of each of the measuring fields is converted individually in converters 13' and 13" into voltage fluctuations $\Delta U_1$ and $\Delta U_2$, respectively, which are added.

Figure 7:
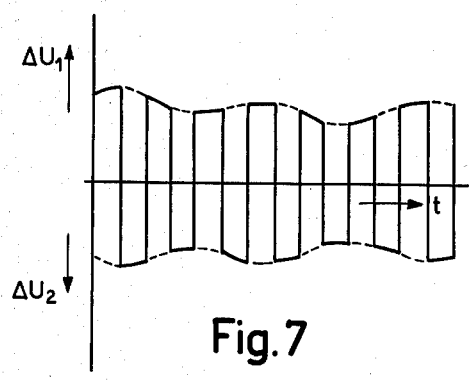
FIG. 7 is a graph of the voltage characteristic of an arrangement as shown in FIG. 6.

FIG. 7 shows the resulting voltage $\Delta U = \Delta U_1 + \Delta U_2$. This combined voltage $\Delta U$ contains information for a considerably longer portion of the measuring time $t$, namely a portion which is substantially twice the portion of the measuring time $t$ covered by an arrangement as shown in FIG. 4.

Since the movement of the tested material between the measuring fields need only be a relative one, it is immaterial whether the materials moves and the measuring fields are stationary or vice versa.

FIG. 8 shows an example of an embodiment wherein the material 10 being tested is at rest and the measuring fields produced by capacitors 11, 12 and 14, 15 are moved. The measuring condensers, which are constructed similarly to FIG. 2, are arranged perpendicular to the plane of the drawing. They are secured to a support 16 in such a manner that their planes form an angle $\alpha$. The support 16 is pivotally mounted on a pin 19 and is freely swingable between abutments 17 and 18. By means of a suitable device, for example, by an eccentric 20 with a connecting rod 21 the support 18 can be oscillated. Rotation of a shaft whereon the eccentric 20 is mounted, causes oscillation of the support 16 between the abutments 17 and 18 whereby the measuring fields of the capacitors 11, 12 and 14, 15, respectively, are moved alternately towards and away from the material being tested.

FIG. 9 is a perspective view of an arrangement which is similar in principle to that shown in FIG. 8. The ends of rod-shaped electrodes 11', 12' and 14', 15' are connected to supports 16' which are pivotable about an axis 19', 19". The measuring fields extend between the electrodes. The supports 16' are provided with recesses 26 accommodating the material 10 when the supports are in their extreme positions. The assembly is oscillated by alternating-current magnets. An alternating-current generator 22, the frequency of which is tuned to the oscillating frequency of the arrangement, energizes electromagnets 23, 24. Between these is an armature 25 which is secured to the support 16' and which is reciprocated by magnetic forces.

The material 10 to be tested frequently has a non-circular or flat cross section and has the shape of a ribbon. Conventional measuring fields, whether capacitative or optical, are influenced differently according to whether the flat material to be tested lies with its narrow side or with its broad side in the measuring field.

FIG. 10a shows a material 10 whose broad sides are opposite the electrodes 11, 12 of a measuring condenser; FIG. 10b shows the same material orientated with its narrow sides opposite the electrodes.

FIG. 11 represents a graph of the measured voltage $\Delta U$ as a function of time and during the time intervals $a$, for example, when the material is orientated as shown in FIG. 10a and during the time intervals $b$ when the material is in the position shown in FIG. 10b. The differences between the voltage $\Delta U$ measured during the periods $a$ and $b$ indicate the different values of capacitance which are caused by the ribbon-shaped material. An error-free measurement of the weight per unit of length of the tested material is therefore only possible if the different values are continuously measured. According to the invention this is achieved by placing the planes of the measuring fields at a specific angle $\alpha$ different from zero, for example, as shown in FIG. 8. The sum of the measured voltage delivered by the two measuring fields corresponds to the average of the individual voltages which, per se, are different.

The measuring fields which are influenced by the material being tested may be formed by arrangements other than electric capacitors.

FIG. 12 shows diagrammatically an arrangement having optical measuring fields. Here, the material 10 being tested alternately influences two beams of light 36 and 37. These are produced by light sources 31 and 32 which are fed from electric mains 33. Lenses 34 and 35 focus the light to form the light beams 36 and 37 which are directed towards photo-electric cells 38 and 39. The amount of light received by these cells causes photo-emissions which are converted by a voltage source 40 into photo-electric currents. The voltage drops at the photoresistors 41 and 42 are a measure of the amounts of incident light so that a voltage difference appears at the terminals 43 and 44 when the quantities of light received by the photo-electric cells are unequal. The fluctuations in this voltage difference are a measure of the variations in the cross section of the material being tested.

This optical method of measuring also permits the use of the principle explained with reference to FIGS. 10a and 10b whereby the material being tested is illuminated from different directions. For this purpose one beam of light, for example 36, should be provided from left to right in the plane of the drawing as shown in FIG. 12, whereas the beam of light 37 should be provided from top to the bottom of FIG. 12 and in the plane of the drawing. The material to be tested would be moved, for example, at an angle of 45° to the axes of the beams of light.

The optical measuring system may be so arranged that instead of moving the cross-sectional center of gravity of the material to be tested the beams of light are moved by moving their transmitters and receivers, or by other suitable arrangements.

FIG. 13 shows a capacitor arrangement similar to the arrangement shown in FIG. 9. Electrode rods 11″, 12″ and 14″ are installed between two end plates 16″. In this case, the rod 12″ serves as an electrode for both measuring fields. The thread 10 runs in a notch 26′ which is so dimensioned that the thread does not brush against the plates 16″ when the capacitor moves about the axis 19. This arrangement is possible because the two measuring fields have a common potential so that the electrode rods 12 and 15 shown separate in FIG. 9 can be combined.

A corresponding circuit is illustrated diagrammatically in FIG. 14. The measuring fields lie between the electrodes 11, 12 and 14, 12 and the electrode 12 is at an alternating-current potential 50. In a bridge circuit, the measuring fields are parts of an analysis circuit 13. This bridge circuit comprises rectifiers 51, 52, 53 and 54 and between them a potentiometer 55. The wiper of the potentiometer 55 is connected through a capacitor 56 to a terminal 57. Voltage fluctuations relative to the basic potential at a terminal 58 can be measured when the measuring fields are influenced by fluctuations in the count of the thread 10.

FIG. 15 schematically shows a device for laterally moving a thread 10 to the extent S while the thread longitudinally moves between stationary condenser plates 11 and 12. A rotating cam 20 swings a lever 65 pivotally mounted on supports 63 and 64 in a vertical plane. A thread guide 61 is mounted on the free end of an arm 62 of the lever 65 and is provided with a notch through which the thread 10 moves.

I claim:

1. A method of measuring the denier of textile thread, comprising:
   longitudinally moving the thread between two measuring fields,
   the lines of flux of one measuring field forming an angle with the lines of flux of the second measuring field and the thread being longitudinally moved at a location distant from the apex of said angle,
   simultaneously relatively reciprocating at a predetermined frequency and amplitude the thread and the measuring fields in a direction normal to the thread for alternately moving the thread into and out of said measuring fields and alternately influencing the two measuring fields by the thread, and
   measuring the extent of influence of the thread on said measuring fields.

2. A method as defined in claim 1 wherein said measuring fields are formed by electric capacitors.

3. A method as defined in claim 1 wherein said measuring fields are formed by light rays.

4. A method as defined in claim 1 wherein said measuring fields are reciprocated and the thread is only longitudinally moved.

5. A method as defined in claim 1 wherein said measuring fields are stationary and the thread is reciprocated.

6. A method of measuring the denier of textile thread, comprising:
   longitudinally moving the thread between two juxtaposed measuring fields,
   the lines of force of one measuring field being oriented to the lines of force of the second measuring field at an angle and the thread being longitudinally moved at a location distant from the apex of said angle,
   simultaneously relatively reciprocating at a predetermined frequency and amplitude the thread and the measuring fields in a direction normal to the thread for alternately moving the thread into and out of said measuring fields for alternately influencing the two measuring fields by the thread,
   converting the variations produced by the thread in each of the two measuring fields into corresponding voltage fluctuations, and
   electrically adding the voltage fluctuations produced in the two measuring fields.

7. An apparatus for measuring the denier of textile thread, comprising:
   means forming two juxtaposed measuring fields whose lines of energy form an angle therebetween,
   means for moving a thread longitudinally between said measuring fields at a location distant from the apex of said angle,
   means for reciprocatingly moving said means forming said measuring fields in a direction substantially normal to the thread for alternately influencing said measuring fields by the thread, and
   means for measuring the extent of influence of the thread on said measuring fields.

8. An apparatus for measuring the denier of textile thread, comprising:
   means forming two juxtaposed measuring fields whose lines of energy form an angle therebetween,
   means for moving a thread longitudinally between said measuring fields at a location distant from the apex of said angle,
   means for reciprocatingly moving the thread in a direction substantially normal to the thread for alternately influencing said measuring fields by the thread, and
   means for measuring the extent of influence of the thread on said measuring fields.

9. An apparatus for measuring the denier of textile thread, comprising:
   two light rays directed at an angle to the thread and forming two measuring fields,
   means for relatively reciprocatingly moving the thread and said light rays in a direction substantially normal to the thread for alternately influencing said measuring fields by the thread,
   a photoelectric cell placed in the path of each light ray, and
   a source of electric current connected to said photoelectric cells for passing a measurable current through said cells corresponding to the light intensity permitted by the thread to pass to said photoelectric cells.

10. An apparatus for measuring the denier of textile thread, comprising:
    two condensers having electrodes placed laterally of the thread and forming two plane measuring fields directed at an angle to each other,
    means for moving a thread longitudinally between said measuring fields and at a location distant from the apex of said angle,
    means for relatively reciprocatingly moving the thread and said condensers in a direction substantially normal to the thread for alternately moving the thread into and out of said measuring fields for alternately influencing the two measuring fields by the thread, and
    means for converting the variations produced by the thread in each of the two measuring fields into corresponding voltage fluctuations.

11. An apparatus as defined in claim 10 wherein said condensers are boundary field condensers.

12. An apparatus as defined in claim 10 wherein said electrodes have a circular cross-sectional configuration.

13. An apparatus as defined in claim 10 wherein said condensers are plate condensers.

14. An apparatus as defined in claim 10 wherein the equipotential lines of said electrodes are substantially parallel with the thread.

15. An apparatus as defined in claim 10 including means for adding the voltage fluctuations produced in the two measuring fields.

16. An apparatus as defined in claim 10 wherein there are at least three rod-shaped electrodes, one of said electrodes being common to both condensers, support means being provided for supporting said electrodes in parallel relation with each other and with the thread, said means for relatively reciprocatingly moving the thread and said condensers being connected to said support means for reciprocatingly moving said electrodes normal to the longitudinal axes thereof.

17. An apparatus according to claim 16 wherein said support means has a recess accommodating the thread.

18. An apparatus according to claim 16 including an analysis circuit comprising an electric bridge, each of said measuring fields being arranged in one arm of said bridge, the electrode which is common to the two condensers being connected to the junction point of the two arms wherein said measuring fields are arranged.

References Cited by the Examiner

UNITED STATES PATENTS

| | | | |
|---|---|---|---|
| 2,671,199 | 3/1954 | Truitt | 250—219 |
| 2,961,548 | 11/1960 | Prell | 250—219 |
| 2,991,685 | 7/1961 | Van Dongeren | 250—219 |
| 3,016,464 | 1/1962 | Bailey | 250—219 |

FOREIGN PATENTS 744,311  2/1956  Great Britain.

RALPH G. NILSON, *Primary Examiner.*